Sept. 13, 1960
J. J. FELTS
2,952,339
BRAKE SEAL
Filed Aug. 13, 1956
2 Sheets-Sheet 1
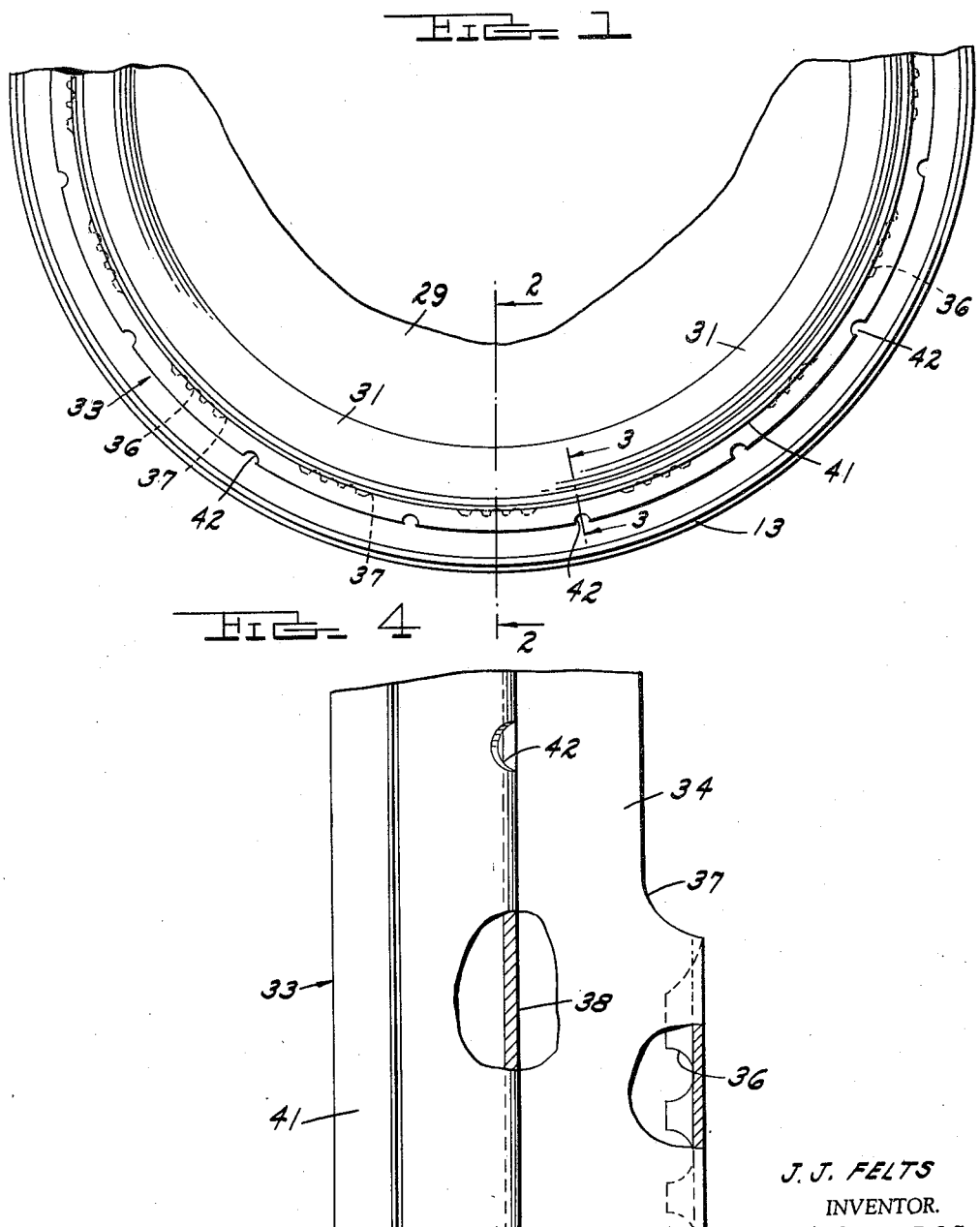
J. J. FELTS
INVENTOR.
E. C. McRAE
J. R. FAULKNER
T. H. OSTER
BY
ATTORNEYS Sept. 13, 1960     J. J. FELTS     2,952,339
BRAKE SEAL
Filed Aug. 13, 1956     2 Sheets-Sheet 2
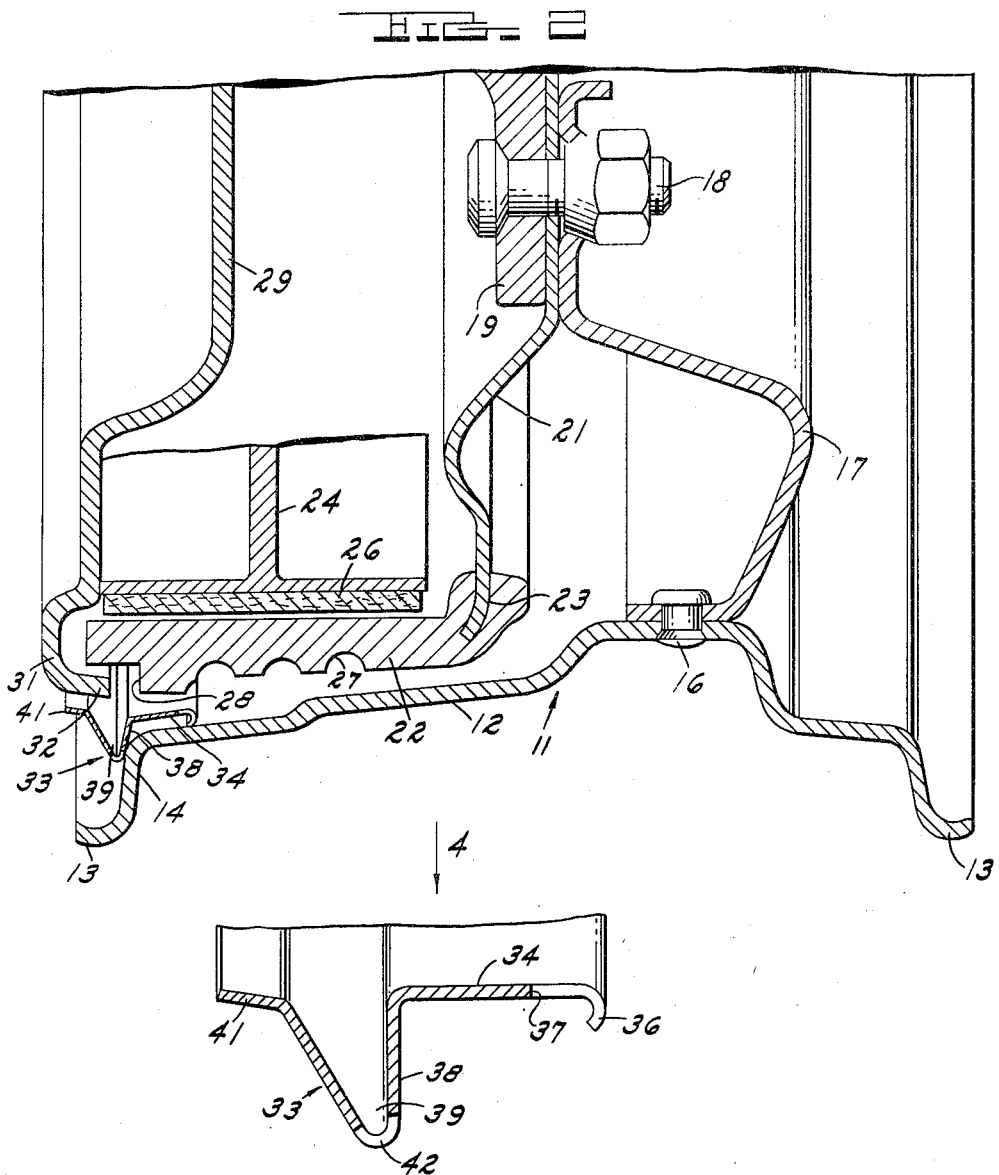
J. J. FELTS
E. C. McRAE
J. R. FAULKNER
T. H. OSTER
INVENTOR.
BY
ATTORNEYS United States Patent Office 2,952,339
Patented Sept. 13, 1960

2,952,339

BRAKE SEAL

Jerome J. Felts, Walled Lake, Mich., assignor to Ford Motor Company, Dearborn, Mich., a corporation of Delaware Filed Aug. 13, 1956, Ser. No. 603,666

7 Claims. (Cl. 188—218)

This invention relates to a new and improved seal for the brakes of a motor vehicle or the like.

The current trend in motor vehicle wheels is to go from a conventional wheel of fifteen inches to a small diameter wheel of fourteen inches. At the same time, engine horsepower has remained the same, or increased and the brakes, of course, must remain the same or increase in size. For example, in one of the present-day vehicles, the twelve inch brake is used in a fifteen inch diameter wheel without difficulty. In changing to a fourteen inch diameter wheel, however, difficulty has been experienced in fitting this brake within the wheel. Expensive brake and wheel redesign often results if resort to a smaller brake size is to be avoided. Neither one of these alternatives is desirable.

In the applicant's invention, he has solved this problem by eliminating the conventional sealing flange of the brake drum which heretofore has co-operated with the peripheral flange of the backing plate to form the labyrinth dust and water trap between the backing plate and the drum. Instead, the applicant has assembled to the interior surface of the wheel rim an annular sheet metal strip having inturned teeth which provides a clearance between the annular strip and the peripheral flange of the backing plate to form the seal therewith. The saving in radial space permits easy installation of a twelve inch brake within a fourteen inch wheel. Improved water drainage is provided in the annular strip in the form of a plurality of apertures radially spaced about the periphery of the strip. A further advantage of this construction resides in the fact that the sealing ring is easily mountable and securable. Furthermore, the invention readily adapts itself to mass production and can be provided without material changes in the brake components and without materially increasing the cost of the design.

Other objects and advantages of the invention will be made apparent as this description proceeds, particularly when considered in connection with the accompanying drawings, wherein:

Figure 1 is a fragmentary side elevational view of the inboard side of a motor vehicle wheel incorporating the present invention.

Figure 2 is a vertical cross-sectional view taken on the plane indicated by the line 2—2 of Figure 1.

Figure 3 is an enlarged vertical cross-sectional view of the annular strip in its unstressed form taken on the plane indicated by the line 3—3 of Figure 1 and showing one of the drainage apertures.

Figure 4 is an enlarged fragmentary plan elevational view partly in section of Figure 3.

Referring to the drawings, the reference character 11 indicates generally a wheel rim having a central portion 12 and upturned radially outwardly disposed terminal flanges 13. The terminal flanges 13 are joined at rounded shoulder 14 to the central portion 12, which in turn is attached by rivets 16 to a wheel disc 17. Adjacent its inner periphery, the annular wheel disc 17 is conventionally connected by bolts 18 to the radially extending flange 19 of the wheel hub (not shown). A tire, which is not shown, is carried conventionally on the central portion 12 between the terminal flanges 13.

Also connected to the radial flange 18 of the wheel hub by the attaching bolts 18, is the annular supporting flange 21 of the brake drum 22. The radial inner portion of the supporting flange is located between the hub flange 19 and the wheel disc 17, while the radial outer portion 23 thereof supports the cast brake drum 22 at its outboard end. A pair of brake shoes 24 are provided carrying brake linings 26 engageable with interior surface of the brake drum 22 in a conventional manner.

Brake drum 22 is provided with integrally cast annular grooves 27 to facilitate heat dissipation. On the inboard side of the brake drum and on the peripheral edge thereof there is provided an annular square notch 28 for a purpose to be explained later.

A stationary brake backing plate 29 is rotatably mounted upon the wheel hub (not shown) and in its outer periphery is formed with a reverse bent portion 31 terminating in an axially extending marginal flange 32. As can be seen in Figure 2, the inboard edge of the brake drum projects axially a small distance into the bent portion 31 while the marginal flange 32 ends in the area of the annular square notch 28. The construction provides a substantial portion of the labyrinth dust and water trap.

Applicant's seal is completed by providing a demountable formed sheet metal strip generally indicated at 33 which comprises an annular generally axially extending flat ring 34 positioned between the brake drum 22 and the central portion 12 of the rim. In its unstressed condition, ring 34 extends axially from a point in vertical alignment with the rounded shoulder 14 at the inboard side of the rim to a point in general vertical alignment with the edge of the annular cooling grooves 27. At a plurality of circumferentially evenly spaced apart points on the axially inward edge of the ring 34 are a series of outwardly extending inturned gripping teeth 36 separated from each other by recesses 37. The recess 37 permits a predetermined amount of inward flexing of the teeth 36 as the unit is pushed up the ramp like inner face of the central portion 12.

At its axially outward edge, the ring 34 is bent radially outwardly to form a support flange 38 which bottoms on the shoulders 14. Flange 38 is bent outwardly and inwardly to form a V-like trough 39 and then angled slightly inwardly in an axial direction to form the flared lip 41. The outer edge of the lip 41 is located in the horizontal plane of the ring 32 as shown in its unstressed form of Figure 3.

It is also to be noted that the V-trough 39 is positioned in substantial vertical alignment with the end of the marginal flange 29 of the backing plate. Effective water drainage is obtained through a plurality of evenly spaced apart apertures 42 located in the lowermost part of the trough.

Through the use of the applicant's invention, it is commercially possible to utilize a currently used twelve inch brake in a fourteen inch wheel at a minimum of cost. The demountable strip 33 may be conventionally stamped and formed by conventionally known manufacturing methods. Its installation is both easy and dependable.

It is possible, of course, to employ a variety of gripping means to secure the strip 33 to the control rim portion which are not herein disclosed. It will be understood, therefore, that the invention is not to be limited to the exact construction shown and described, but that various changes and modifications may be made without departing from the spirit and scope of the invention, as defined in the appended claims.

What is claimed is:

1. In combination, a wheel and brake seal construction comprising a hub, a wheel disc secured to said hub and a wheel rim secured to the periphery of said disc, said wheel rim having a central portion terminating at a rounded shoulder to define radially extending terminal flanges, a generally radially extending brake drum flange secured to said wheel hub, an axially extending brake drum at the outer periphery of said supporting flange, an annular notch at the outer inboard peripheral edge of said brake drum, a stationary radially extending brake backing plate at the inboard side of said brake drum having a reverse bent portion terminating in an axially extending marginal flange extending into the area of the annular notch, an annular demountable strip having a generally axially extending ring and provided with resilient gripping means on the outboard side of said ring, said means adapted to grip the inner surface of said wheel rim central portion, a radially extending support flange integral with said ring at the inboard side thereof and terminating at said shoulder, then bent to form an inwardly extending lip a predetermined distance radially outwardly from said marginal flange to form an annular passage way between said annular strip and said marginal flange.

2. A vehicular wheel and brake seal combination comprising a rotatable hub, a radially extending wheel disc secured to said hub, and a wheel rim consisting of a depressed central portion with upstanding terminal flanges defining a rounded shoulder at the juncture of said terminal flanges and said central portion, a radially extending brake drum flange secured to said wheel hub, an axially extending brake drum supported at its outboard side by said brake drum flange, a radial square indentation at the outer inboard edge of said brake drum, a non rotatable backing plate at the inboard side of said brake drum having a reverse bent section terminating in a substantially axially extending marginal flange extending generally into the area defined by said annular square indentation, a movable annular sheet metal strip having a generally flat ring portion terminating in a plurality of resilient inturned spaced apart fingers on the outboard side of said wheel and adapted to frictionally grip the inside of said rim central portion, said fingers being separated by scalloped sections of metal, a radially outwardly extending support flange at the other end of said ring terminating at the shoulder of said rim and bent radially inwardly and forwardly to define a trough thence bent in a generally axial direction to define a lip, a plurality of apertures in the bottom of said trough said apertures being spaced medially of said gripping fingers, and said marginal flange terminating in the direct vertical alignment with said apertures, said lip being radially spaced from said marginal flange a predetermined distance and being axially disposed inwardly of the outer extremity defined by the reverse bent section of said backing plate.

3. In combination, a wheel and brake seal construction comprising a hub, a wheel disc secured to said hub and a wheel rim secured to the periphery of said disc, said wheel rim having a central portion terminating at a rounded shoulder to define radially extending terminal flanges, a generally radially extending brake drum flange secured to said wheel hub, an axially extending brake drum at the outer periphery of said supporting flange, an annular notch at the outer inboard peripheral edge of said brake drum, a stationary radially extending brake backing plate at the inboard side of said brake drum having a reversed bent portion terminating in an axially extending marginal flange extending into the area of the annular notch, an annular strip having a generally axially extending ring and provided with gripping means on the outboard side of said ring, said means adapted to grip the inner surface of said wheel rim central portion, a radially extending support flange integral with said ring at the inboard side thereof and terminating at said shoulder, then bent outwardly and inwardly to form a V-shaped trough and then bent to form an inwardly extending lip, said trough having a plurality of spaced apart drain holes pierced through the bottom of said trough, and said inwardly extending lip being displaced a predetermined distance radially outwardly from said marginal flange to form an annular passageway between said annular strip and said marginal flange.

4. In a wheel assembly including a brake assembly having a brake drum provided with an annular notch at one of its outer peripheral edges, a stationary backing plate having an axially extending marginal flange extending into the area of the annular notch, a wheel rim encircling the brake drum in spaced relation to said brake drum and marginal flange, a demountable annular strip resiliently mounted upon said wheel rim in spaced apart relationship to said marginal flange whereby said annular notch, marginal flange, and annular strip define a labyrinth dust and water trap for said brake assembly.

5. In a vehicle wheel including a brake drum, a wheel rim encircling the brake drum in spaced relationship and forming an annular space, a brake backing plate having a marginal flange extending into said annular space in spaced apart relationship to said brake drum and said wheel rim, a demountable annular strip resiliently supported on said wheel rim between said wheel rim and said marginal flange in spaced apart relationship to said marginal flange and partially closing said annular space whereby a labyrinth dust and water trap is provided for said brake assembly.

6. In combination with a wheel including a tire rim and brake drum, said brake drum having an annular notch at one of its outer peripheral edges, a backing plate having a marginal end portion extending into the area adjacent to said notch, said tire rim encircling said brake drum in spaced apart relationship therewith, an annular strip having resilient means for securing said strip to said wheel tire rim in spaced apart relationship to said marginal flange and brake drum, said strip having a trough portion formed therein for the trapping of moisture and at least one drain hole in said trough for draining said moisture from said trough.

7. A labyrinth dust and water trap arrangement in a wheel assembly having a brake drum positioned within the radial confinements of a wheel rim, a backing plate having an axially extending marginal flange disposed over a notched portion of said brake drum and in spaced apart relationship thereto, a demountable stamped annular member having spaced apart resilient means for mounting said member upon said wheel rim in radial displaced position to said marginal flange whereby said marginal flange and annular strip member define a dust seal and water trap for said brake drum.

References Cited in the file of this patent

UNITED STATES PATENTS

| 1,943,837 | Perrot | Jan. 16, 1934 |
| 1,954,757 | Maranville | Apr. 10, 1934 |
| 2,167,607 | Alden | July 25, 1939 |
| 2,197,583 | Koeppen et al. | Apr. 17, 1940 |
| 2,349,658 | Horn | May 23, 1944 |
| 2,701,037 | Lyon | Feb. 1, 1955 |

FOREIGN PATENTS

| 744,837 | Great Britain | Feb. 15, 1956 |